US008711961B2

(12) United States Patent
Heath, Jr. et al.

(10) Patent No.: US 8,711,961 B2
(45) Date of Patent: Apr. 29, 2014

(54) COMMUNICATING CHANNEL STATE INFORMATION USING PREDICTIVE VECTOR QUANTIZATION

(75) Inventors: Robert W. Heath, Jr., Austin, TX (US); Takao Inoue, Austin, TX (US)

(73) Assignee: The Board of Regents of The University of Texas System, Austin, TX (US)

( * ) Notice: Subject to any disclaimer, the term of this patent is extended or adjusted under 35 U.S.C. 154(b) by 723 days.

(21) Appl. No.: 12/836,843

(22) Filed: Jul. 15, 2010

(65) Prior Publication Data

US 2012/0014424 A1 Jan. 19, 2012

(51) Int. Cl.
*H04B 7/02* (2006.01)

(52) U.S. Cl.
USPC ............. 375/267; 375/347; 375/346; 455/69

(58) Field of Classification Search
USPC .............................. 375/267, 347, 346; 455/69
See application file for complete search history.

(56) References Cited

U.S. PATENT DOCUMENTS

| | | | |
|---|---|---|---|
| 4,924,298 A | 5/1990 | Kitamura | |
| 7,116,723 B2 | 10/2006 | Kim et al. | |
| 7,181,167 B2 | 2/2007 | Onggosanusi et al. | |
| 7,197,486 B2 | 3/2007 | Asai et al. | |
| 7,359,470 B2 | 4/2008 | Molisch et al. | |
| 2004/0253986 A1 | 12/2004 | Hochwald et al. | |
| 2008/0108310 A1* | 5/2008 | Tong et al. | 455/69 |
| 2008/0166977 A1* | 7/2008 | Khayrallah | 455/69 |
| 2008/0207135 A1* | 8/2008 | Varadarajan et al. | 455/69 |
| 2009/0067529 A1 | 3/2009 | Mielczarek et al. | |

OTHER PUBLICATIONS

Lei et al. "Performance Analysis of Adaptive Interleaving for OFDM Systems" IEEE Transactions on Vehicular Technology, vol. 51, No. 3, May 2002.*
A. Haoui and David G. Messerschmitt; "Predictive Vector Quantization"; Proc. of IEEE Int. Conf. on Acoustics, Speech and Signal Process., vol. 9, 1984, pp. 420-423.
Hsueh-Ming Hang and John W. Woods; "Predictive Vector Quantization of Images"; IEEE Trans. Commun., vol. 33, No. 11, pp. 1208-1210, 1985.
Alan Edelman, Tomas Arias, and Steven T. Smith; "The Geometry of Algorithms With Orthogonality Constraints"; SIAM J. Matrix Analysis and Applications, vol. 20, No. 2, pp. 303-353, 1998.
Aradhana Narula, Michael J. Lopez, Mitchell D. Trott, and Gregory W. Wornell; "Efficient Use of Side Information in Multiple-Antenna Data Transmission Over Fading Channels"; IEEE J. Sel. Areas Commun., vol. 16, No. 8, pp. 1423-1436, 1998.
Hosan Khalil, Kenneth Rose, and Shankar L. Regunathan; "The Asymptotic Closed-Loop Approach to Predictive Vector Quantizer Design With Application in Video Coding", IEEE Transactions on Image Processing, vol. 10, No. 1; Jan. 2001.

(Continued)

*Primary Examiner* — Leila Malek
(74) *Attorney, Agent, or Firm* — Dorsey & Whitney LLP

(57) ABSTRACT

Techniques are generally described here for communicating channel state information using predictive vector quantization. In some examples, a method may include measuring channel state information based, at least in part, on signals received over a communications channel. An error vector may be calculated between the measured channel state information and predicted channel state information. The error vector may be quantized, and subsequent channel state information may be predicted based, at least in part, on the quantized error vector.

30 Claims, 7 Drawing Sheets

(56) References Cited

OTHER PUBLICATIONS

Lizhong Zheng and David N. C. Tse; "Communication on the Grassmann Manifold: A Geometric Approach to the Noncoherent Multiple-Antenna Channel"; IEEE Transactions on Information Theory; vol. 48, No. 2; Feb. 2002.
A. Barg, and D. Nogin; "Bounds on Packings of Spheres in the Grassmann Manifolds"; IEEE Trans. Inf. Theory, vol. 48, No. 9, pp. 2450-2454, 2002.
David J. Love and Robert W. Heath, Jr. "Grassmannian Beamforming for Multiple-Input Multiple-Output Wireless Systems"; IEEE Trans. Inf. Theory, vol. 49, No. 10, pp. 2735-2747, 2003.
Ines Kammoun and Jean-Claude Belfiore "A New Family of Grassmann Space-Time Codes for Non-Coherent MIMO Systems"; IEEE Communications Letters; vol. 7, No. 11, Nov. 2003; pp. 528-530.
Antonio M. Cipriano, Ines Kammoun, and Jean-Claude Belfiore; "Simplified Decoding For Some Non-Coherent Codes Over the Grassmannian"; Proc. of IEEE Int. Conf. on Communication, vol. 2, 2005, pp. 757-761.
Wei Dai, Youjian Liu, and Brian Rider; "Quantization Bounds on Grassmann Manifolds of Arbitrary Dimensions and MIMO Communications With Feedback"; Proc. of IEEE Global Telecom. Conf. vol. 3, 2005, pp. 1456-1460.
Bishwarup Mondal, Satyaki Dutta, and Robert W. Heath, Jr. "Quantization on the Grassmann Manifold"; Proc. of IEEE Int. Conf. on Acoustics, Speech and Signal Process. vol. 5, 2005, pp. 1025-1028.
Li Liu and Hamid Jafarkhani; "Novel Transmit Beamforming Schemes for Time-Selective Fading Multiantenna Systems"; IEEE Transactions on Signal Processing; vol. 54, No. 12; Dec. 2006; pp. 4767-4781.
Kabin Huang, Bishwarup Mondal, Robert W. Heath, Jr. and Jeffrey G. Andrews; "Markov Models for Limited Feedback MIMO Systems"; Proc. of IEEE Int. Conf. on Acoustics, Speech and Signal Process; vol. 4, 2006, pp. 9-12.
Bishwarup Mondal, Robert W. Heath, Jr. and Leif W. Hanlen; "Quantization on the Grassmann Manifold: Applications to Precoded MIMO Wireless Systems"; IEEE Trans. Signal Process., vol. 55, No. 8, pp. 4208-4216, 2007.
Alexei Ashikhmin and RaviKiran Gopalan; "Grassmannian Packings for Efficient Quantization in MIMO Broadcast Systems"; Proc. of IEEE Int. Symp. on Info,. Theory, pp. 1811-1815; 2007.
Kaibin Huang, Robert W. Heath, Jr., and Jeffrey G. Andrews; "Multiuser Limited Feedback for Wireless Multi-Antenna Communication"; Proc. of IEEE Int. Symp. on Info Theory, pp. 2036-2040, 2007.
Kaibin Huang, Robert W. Heath, Jr., and Jeffrey G. Andrews; "Limited Feedback Beamforming Over Temporally-Correlated Channels"; IEEE Trans. Signal Process; vol. 57, No. 5; pp. 1959-1975, 2009.
Begelfor, E., and Werman, M., "Affine invariance revisited," Computer Society Conference on Computer Vision and Pattern Recognition, IEEE, 2006, pp. 2087-2094, vol. 2.
Inoue, T., and Heath Jr, R.W., "Predictive Coding on the Grassmann Manifold," IEEE Transaction on Signal Processing, Aug. 2009, pp. 1-9.
Jindal, N., "MIMO Broadcast Channels with Finite-Rate Feedback," IEEE Transactions on Information Theory, 2006, pp. 5045-5060, vol. 52, Issue 11.
Love, D.J., and Heath, Jr. R.W., "Limited Feedback Unitary Precoding for Spatial Multiplexing," Transaction on Information Theory, IEEE, Aug. 2005, pp. 2967-2976, vol. 51, No. 8.
Mondal, B., et al., "Adaptive feedback for MIMO beamforming systems," IEEE 5th Workshop on Signal Processing Advances in Wireless Communications, 2004, pp. 213-217.
Raghavan, V., et al., "Systematic codebook Designs for Quantized Beamforming in Correlated MIMO Channels," IEEE Journal on Selected Areas in Communications, 2007, pp. 1298-1310, vol. 25, Issue. 7.

\* cited by examiner

COMMUNICATING CHANNEL STATE INFORMATION USING PREDICTIVE VECTOR QUANTIZATION

STATEMENT REGARDING RESEARCH & DEVELOPMENT

This invention was made with government support under CCF0514194 and CNS0626797 awarded by the National Science Foundation. The government has certain rights in the invention.

BACKGROUND

Unless otherwise indicated herein, the materials described in this section are not prior art to the claims in this application and are not admitted to be prior art by inclusion in this section.

Multiple-input multiple-output (MIMO) communication systems employ multiple transmit antennas and multiple receive antennas to communicate data symbols over a communications channel. MIMO communication systems may allow a plurality of receivers to be serviced utilizing a same frequency band. In this manner, MIMO communication systems may advantageously increase an amount of data the communication systems are able to send to users.

MIMO systems may find use in a variety of applications including, but not limited to, wireless networks, cellular systems including 3G and 4G systems, such as 3GPP LTE-Advanced, local and wide area networks, and wireless broadband systems (such as WiMAX).

Generally, a transmitter in a MIMO system may have a plurality of antennas, designated mathematically by $N_t$ and a plurality of receivers, U. The receivers U may each have a single antenna or multiple antennas for receipt of data over the communications channel. The transmitter, which may be implemented as a base station, may be configured to simultaneously transmit one symbol for each of the receivers.

The communications channel, however, may introduce a variety of non-idealities to a transmitted signal, such as may be caused by multipath interference, reflections, motion of one or more receivers, or other properties of a communications channel. A vector of transmit messages to be transmitted over the communications channel may be represented by a vector $s=[s_1 \ldots s_U]^T$, where $^T$ denotes a transposition operation. The transmitter may generate precoded data symbols, mathematically denoted x, from the transmit messages s based on channel state information corresponding to the communications channel.

In a communications channel that may generally be considered a slowly varying frequency flat fading channel, a vector of signals y received by the U antennas may then be expressed as $y=Hx+n$. Where H is a matrix corresponding to the communications channel and n is a noise vector. The channel matrix generally refers to a matrix of data which may represent the operation of the communications channel on the transmitted data symbols, including representations of such effects as reflections. Information about the contents of the matrix H, including, for example the matrix itself or the covariance of the matrix, may be referred to as channel state information. The channel state information may change over time.

Channel state information may generally be generated at a receiver based on data symbols received over the communications channel. The channel state information may then be fed back to a transmitter to adjust transmission properties based on the channel state.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

In the drawings.

SUMMARY

Figure 1:
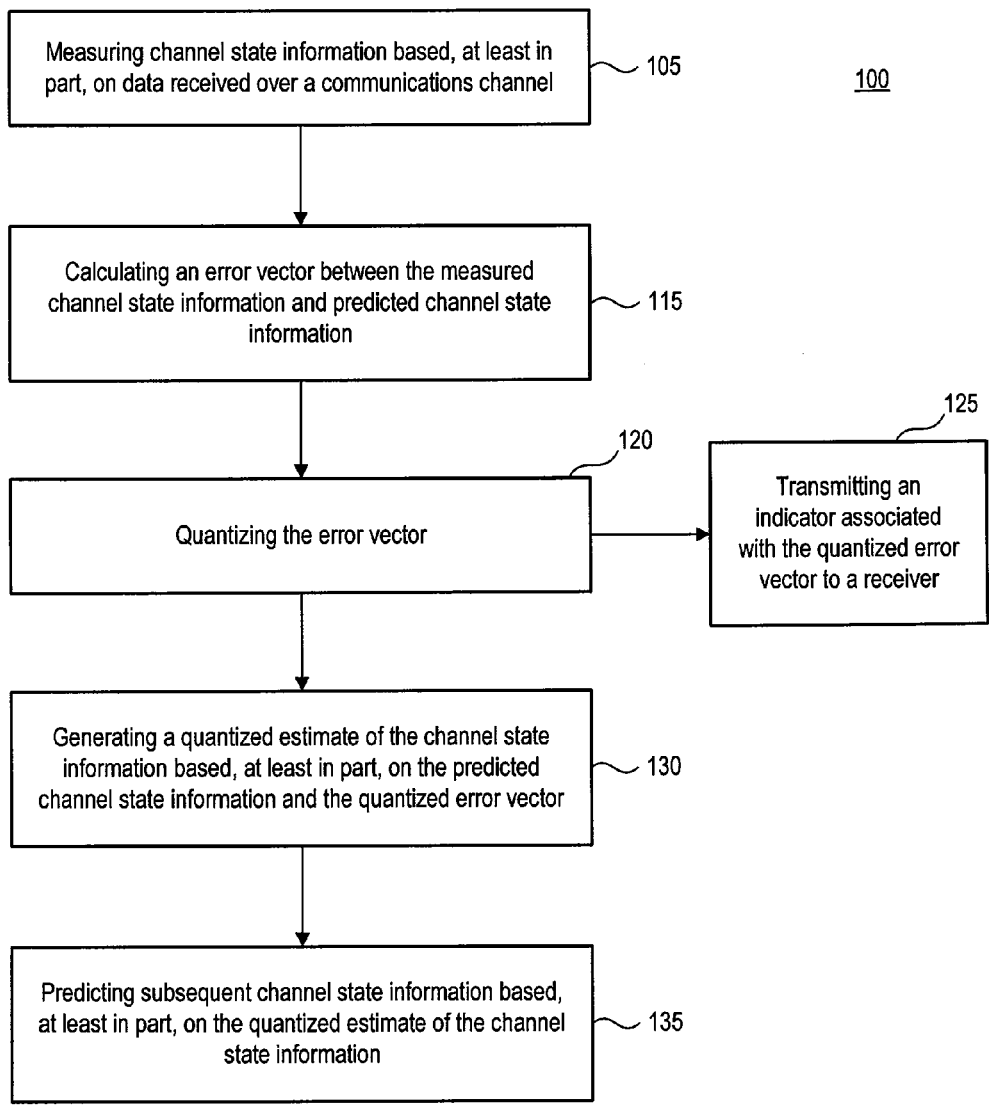
FIG. 1 is a flow diagram illustrating an example method for communicating channel state information arranged in accordance with at least some examples of the present disclosure.

The present disclosure describes a method for communicating channel state information. Some example methods may include measuring channel state information based, at least in part, on data signals received over a communications channel and calculating an error vector between the measured channel state information and predicted channel state information. Example methods may also include quantizing the error vector, and predicting subsequent channel state information based, at least in part, on the quantized error.

The present disclosure describes a method for encoding data for transmission. Some example methods may include receiving signals, encoding data specifying an indicator associated with a quantized error vector, and translating the indicator into the quantized error vector. Some example methods may also include estimating channel state information based, at least in part, on predicted channel state information and the quantized error vector, and encoding data for transmission in accordance with the estimated channel state information.

The present disclosure describes predictive encoders. Some example predictive encoders may include a channel state information calculator configured to calculate measured channel state information based, at least in part, on data signals received over a communications channel. An error calculator may be coupled to the channel state information calculator, wherein the error calculator is configured to receive the measured channel state information, receive the predicted channel state information, and calculate an error vector between the measured channel state information and the predicted channel state information. A quantizer may be coupled to the error calculator, wherein the quantizer is configured to receive the error vector, select at least one codeword from a codebook table corresponding to the error vector, and generate an indicator associated with the selected codeword. A channel state information estimator may be coupled to the quantizer, wherein the channel state information estimator is configured to receive the selected codeword, and generate an estimate of the measured channel state information based, at least in part, on the selected codeword. A channel state information predictor may be coupled to the channel state information estimator, wherein the channel state information predictor is configured to receive the estimate of the channel state information, and calculate subsequent channel state information based, at least in part, on the estimate of the channel state information and previously calculated channel state information.

The present disclosure describes predictive decoders. Some example predictive decoders may include an error translator configured to receive at least one indicator associated with a quantized error vector, and translate the indicator into a quantized error vector. A channel state information estimator may be coupled to the error translator, wherein the channel state information estimator is configured to receive the quantized error vector, and generate an estimate of channel state information based, at least in part, on the quantized error vector and predicted channel state information. A channel state information predictor may be coupled to the channel state information estimator, wherein the channel state information predictor is configured to receive the estimate of the channel state information and calculate the subsequent predicted channel state information based, at least in part, on the estimate of the channel state information and previously calculated channel state information.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

The following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, devices, and/or apparatus generally related to methods, systems, encoders, and decoders for communicating channel state information. In some examples, a method includes measuring channel state information based, at least in part, on signals received over a communications channel. An error vector may be calculated between the measured channel state information and predicted channel state information. The error vector may be quantized, and subsequent channel state information may be predicted based, at least in part, on the quantized error vector.

FIG. 1 is a flow diagram illustrating an example method 100 for communicating channel state information arranged in accordance with at least some examples of the present disclosure. An example method 100 may include one or more functions, operations, or actions as is illustrated by one or more of blocks 105, 115, 120, 125, 130 and/or 135. The various blocks described herein may be performed sequentially, in parallel, or in a different order than those described herein. It should also be appreciated that in some implementations one or more of the illustrated blocks may be eliminated, combined or separated into additional blocks.

Processing for method 100 may begin at block 105, "Measuring channel state information based, at least in part, on data received over a communication channel." Block 105 may be followed by block 115, "Calculating an error vector between the measured channel state information and predicted channel state information." Block 115 may be followed by block 120, "Quantizing the error vector." Block 120 may be followed by block 125, "Transmitting an indicator associated with the quantized error vector to a receiver." Block 120 may also be followed by block 130, "Generating a quantized estimate of the channel state information based, at least in part, on the predicted channel state information and the quantized error vector." Block 130 may be followed by block 135, "Predicting subsequent channel state information based, at least in part, on the quantized estimate of the channel state information."

In block 105, channel state information may be measured by a computing device (e.g. a processor or DSP) or some device (e.g. a circuit, a radio set in the receiver, a portion of a transceiver, etc.) in a base or mobile station that is configured to measure channel state information. Any of a variety of suitable techniques may be used to measure channel state information including a comparison of received data symbols (i.e., signals that include data symbols encoded therein) with a known transmit sequence (i.e., signals that include a sequence of data symbols encoded therein). The channel state information may include any information about the channel matrix, such as the contents of the channel matrix or the covariance of the matrix.

In block 115, an error vector between the measured channel state information and predicted channel state information may be calculated, by a computing device (e.g. a processor or DSP) or some device (e.g. a circuit, a radio set in the receiver, a portion of a transceiver, etc.) in a base or mobile station that is configured to calculate the error vector. The predicted channel state information may be based on previously predicted channel state information. Examples of methods for predicting the channel state information and generating the predicted channel state information will be described further below in a context of predicting subsequent channel state information. Generally, the prediction of the channel state information may be based, at least in part, on previously predicted channel state information. Predictive vector quantization techniques, which will be described further below, may be used to generate the estimate of the channel state information based on one or more prior estimates of the channel state information. Generally any number of prior estimates of the channel state information may be used, including two in some examples. Some predictive vector quantization techniques have been described for speech or video processing, see, for example A. Haoui, et. al. "Predictive vector quantization," in *Proc. of IEEE Int. Conf. on Acoustics, Speech and Signal Process.*, vol. 9, 1984, pp. 420-423; H.-M. Hang et. al. "Predictive vector quantization of images," *IEEE Trans. Commun.*, vol. 33, no. 11, pp. 1208-1219, 1985; and H. Khalil et. al. "The asymptotic closed-loop approach to predictive vector quantizer design with application in video coding," *IEEE Trans. Image Process.*, vol. 10, no. 1, pp. 15-23, 2001, all of which are hereby incorporated by reference in their entirety of any purpose.

However, classical predictive vector quantization techniques may operate on signals in a linear vector space where difference, addition, and prediction operations may be applied in a well understood linear fashion. However, channel state information or other information to be communicated in accordance with examples of this disclosure may lie on a mathematical space known as the Grassmann manifold. Without being bound by theory, the Grassmann manifold may generally represent a spherical space, and may not represent a linear space. The Grassmann manifold may also be described mathematically. $U_n$ may be defined as a unitary group formed by n×n unitary matrices, and the Stiefel manifold, $V_{n,p}$ may be defined as the space of unitary n×p matrices (where p<n). The Grassmann manifold, $G_{n,p}$, may then be the set of subspaces spanned by the columns of $V_{n,p}$. The Grassmann manifold may also be identified as a quotient space of the Stiefel manifold $V_{n,p}/U_p$ or as a quotient space of the unitary group $U_n/(U_{n-p} \times U_p)$. Channel state information may lie on the Grassmann manifold in part because the channel state information may be expressed as a vector assigning a weight to each of a plurality of antennas in a multiple-input multiple-output communications system. The channel state information may be a unit vector. In some examples, constraining channel state information to a unit vector may result in an inability to perform linear operations to add, subtract, or predict channel state information. Accordingly, examples of Grassmannian predictive coding techniques may be used to predict subsequent channel state information from previous channel state information, examples of which are described further below.

Recall in block 115, an error vector between the measured channel state information and predicted channel state information may be calculated, by a computing device (e.g. a processor or DSP) or some device (e.g. a circuit, a radio set in the receiver, a portion of a transceiver, etc.) in a base or mobile station that is configured to calculate the error vector. The error vector may be generated in accordance with techniques for computing a difference on the Grassmann manifold. Mathematically, the channel state information may be represented by a vector $x_k$ and the predicted channel state information may be represented by a vector $\tilde{x}_k$, both of which vectors may lie on the Grassmann manifold. The measured channel state information $x_k$ may represent present channel state information in some examples, and may be based on data symbols received over a communications channel. The predicted channel state information $\tilde{x}_k$ may be calculated using previously predicted channel state information and error calculations, as may be described further below. $\rho$ may denote the vector inner product $\tilde{x}_k^* x_k$. $\theta = \cos^{-1}(|\rho|)$ may describe the subspace angle between $\tilde{x}_k$ and $x_k$. Accordingly, a distance $d(\tilde{x}_k, x_k)$ between the channel state information vectors may be given in one example by a chordal distance $\sqrt{1-|\rho|^2}$; which may also be expressed as $|\sin \theta|$. A tangent vector representing a difference from second channel state information $\tilde{x}_k$ to first channel state information $x_k$ may be mathematically expressed as a vector $e_k$:

$$e_k = \tan^{-1}\left(\frac{d}{|\rho|}\right) \frac{x_k/\rho - \tilde{x}_k}{\|\tilde{x}_k/\rho - x_k\|_2};$$

such that $\|e_k\|_2 = \tan^{-1}(d/|\rho|)$ is an arc length between $\tilde{x}_k$ and $x_k$ and $\vec{e}_k = (x_k/\rho - \tilde{x}_k)/(d/\|\rho\|)$ is a unit tangent direction vector. The generation of the tangent vector may, mathematically, be considered a length preserving unwrapping on an arc between $\tilde{x}_k$ and $x_k$ onto the tangent space at $\tilde{x}_k$. The tangent vector may also be advantageously expressed as a product of a magnitude component and a normalized directional component given above. The tangent vector may also be considered to describe a shortest distance path along an arc from $\tilde{x}_k$ to $x_k$, called the geodesic in some examples. Accordingly, in some examples an error vector between and measured and predicted channel state information may be calculated, and may be mathematically expressed as $e_k$.

In block 120, the error vector may be quantized, by a computing device (e.g. a processor or DSP) or some device (e.g. a circuit, a radio set in the receiver, a portion of a transceiver, etc.) in a base or mobile station that is configured to quantize the error vector. Uniform quantization techniques or scalar quantization may be used. The quantization may be performed with reference to an electronic codebook in some examples. Accordingly, the output of the quantization procedure may be a selection of a code from the codebook. In this manner, the error vector, such as a tangent vector in some examples, may be quantized as equal to one of a plurality of values stored in an electronic codebook. Any of a variety of suitable codebooks may be used including, for example, Grassmannian codebooks or Kerdock codebooks. The quantized error vector may be used to generate a quantized estimate of the channel state information.

Mathematically, the quantization of the error vector may proceed in two steps relative to the magnitude and direction of the error vector. A codebook of error tangent magnitudes may be described as $C_m = \{c_{m,i}\}_{i=1}^{N_m}$; where $N_m$ is a number of codewords. Similarly, a codebook of unit norm error tangent directions may be described as $C_d = \{c_{d,i}\}_{i=1}^{N_d}$; where $N_d$ is a number of codewords. The error vector magnitude may be quantized in some examples by calculating a difference between the error vector and each error vector magnitude in the codebook. A codeword associated with a smallest difference may be selected in some examples. Mathematically, the error vector magnitude may be quantized to an index value $l_k$ of a codeword given by:

$$l_k = \operatorname*{argmin}_{i \in \{1,2,\ldots N_m\}} |\|e_k\|_2 - c_{m,i}|$$

The error tangent direction may then be selected by selecting an error tangent codeword which minimizes a distance between the measured channel state information and the estimated channel state information specified by the selected error tangent magnitude and direction code. A chordal distance is used in some examples, but other distance metrics may also be used. Accordingly, estimated channel state information may be calculated for each of the error tangent directions in the codebook using the selected error tangent magnitude above and the predicted channel state information. For simplicity, the calculation of the estimated channel state information is described mathematically here as a function G, and will be described further below. Mathematically, the error vector direction may be quantized to an index value $i_k$ of a codeword given by:

$$i_k = \operatorname*{argmin}_{i \in \{1,2,\ldots N_d\}} d(G(\tilde{x}_k, c_{m,l_k}, c_{d,i}, 1), x_k);$$

where d is the chordal distance function, and G is a function computing an estimated vector according to the selected error tangent magnitude codeword and error tangent direction codeword. A unit norm tangent direction codeword associated with a minimum chordal distance may be selected in some examples.

In block 125, an indicator associated with the quantized error vector may be transmitted, such as by a mobile station or other transceiver in a communications system, to a receiver, such as for example a receiver in a base station. The transmission may be performed by a computing device (e.g. a processor or DSP) or some device (e.g. a circuit, a radio set in the receiver, a portion of a transceiver, etc.) in a base or mobile station that is configured to measure channel state information. The indicator may include, for example, the quantized error vector itself or an index value. The index values $l_k$ and $i_k$ described above may be used in some examples. A respective index value may be associated with each quantized representation in an electronic codebook. Index values may be implemented, for example, by one or more bits of data associated with each entry in the codebook. The index values may be stored in an electronic storage along with the codebook in some examples, and may be stored separately from the codebook in other examples. By transmitting an indicator associated with the error vector, the channel state information itself may, in some examples, not be transmitted to another transceiver in the communications system. Transceivers receiving the indictor associated with the error vector may calculate channel state information using the error vector, as will be described further below.

In block 130, a quantized estimate of the channel state information may be generated, based, at least in part, on the estimated channel state information and the quantized error vector. The estimate may be generated by a computing device (e.g. a processor or DSP) or some device (e.g. a circuit, a radio set in the receiver, a portion of a transceiver, etc.) in a base or mobile station that is configured to generate a quantized estimate of channel state information. Recall above, the reconstruction of channel state information from previous channel state information and a quantized error vector was described as a function G in some examples. Accordingly, the quantized estimate of the channel state information may in some examples be expressed as $G(\tilde{x}_k, c_{m,l_k}, c_{d,i_k}, 1)$. The function G will now be further described. Also recall as described above, the error vector quantized and indexed by $l_k$ and $i_k$ may be represented as $e_k$. The quantized error vector may mathematically be expressed $e_k'$ which may have a magnitude and direction corresponding to the codewords $l_k$ and $i_k$ selected above. Using the predicted channel state information $\tilde{x}_k$, the quantized difference may be used to generate a quantized estimate of the channel state information $\hat{x}_k$ which may be mathematically expressed as follows:

$\hat{X}_k = G(\tilde{x}_k, e_k', 1) = \tilde{x}_k \cos(\|e_k'\|_2) + \vec{e}_k' \sin(\|e_k'\|_2)$; In this manner, a quantized tangent vector may be mapped back to the Grassmann manifold, and $\hat{x}_k$ may represent a geodesic path. The quantized estimate of the channel state information $\hat{x}_k$ may represent the channel state information which may be generated using the quantized error vector and previously predicted channel state information. In this manner, the quantized estimate of the channel state information $\hat{X}_k$ may in some examples advantageously correspond to the channel state information which may be calculated at another transceiver in the communications system responsive to receipt of the transmitted codeword indices.

In block 135, subsequent channel state information may be predicted, based, at least in part, on the quantized estimate of the channel state information. The prediction may be generated by a computing device (e.g. a processor or DSP) or some device (e.g. a circuit, a radio set in the receiver, a portion of a transceiver, etc.) in a base or mobile station that is configured to predict channel state information. In some examples, the subsequent channel state information is predicted by transporting a calculated error vector forward, and utilizing the transported error vector to calculate the subsequent channel state information. Recall above an error vector between two instances of channel state information may be described mathematically as $e_k$. Above, $e_k$ was given for an error vector between predicted measured and predicted channel state information. However, $e_k$ may in some examples be similarly calculated for an error vector between two instances of predicted channel state information. Previously quantized estimate of the channel state information may in some examples be stored, for example in a transceiver in the communications system. A parallel transported tangent vector may then be given along the geodesic direction from the quantized estimate of the channel state information to subsequent channel state information. The transported tangent vector may be mathematically expressed as:

$$\hat{e}_k = \tan^{-1}\left(\frac{d}{|\rho|}\right)\frac{x_{k+1}/\rho^* - x_k}{d};$$

Accordingly, subsequently predicted channel state information may be calculated using previous estimate of the quantized channel state information as follows:

$\tilde{x}_{k+1} = |\rho|\hat{x} + \rho^*\hat{x}_k - \hat{k}_{k-1}$; Note that the subsequent channel state information may be computed as a linear combination of previously predicted channel state information.

The method described in FIG. 1 may be repeated by using the predicted subsequent state information in a comparison with subsequent measured channel state information. In this manner, channel state information may be periodically updated between transceivers in a communications system by transmitting indicators associated with quantized error vectors.

Figure 2:
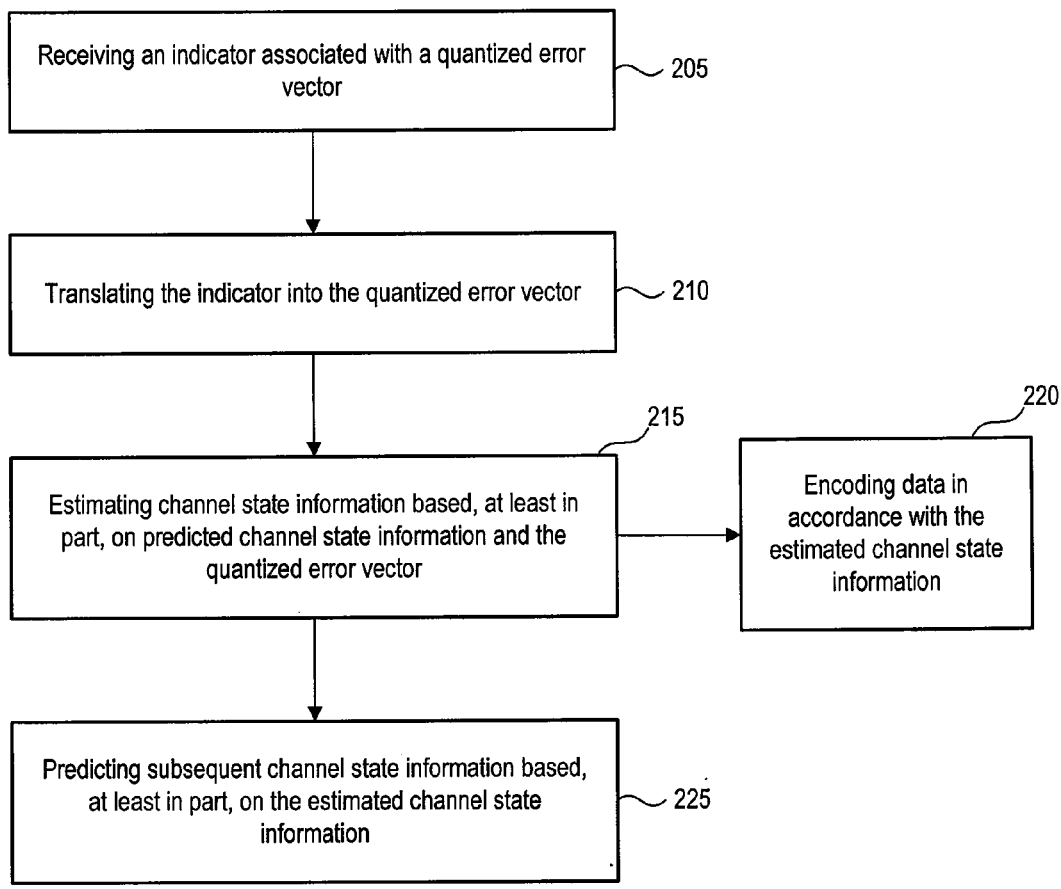
FIG. 2 is a flow diagram illustrating a method for encoding data arranged in accordance with at least some examples of the present disclosure.

FIG. 2 is a flow diagram illustrating a method 200 for encoding data arranged in accordance with at least some examples of the present disclosure. The example method 200 may include one or more functions, operations, or actions as is illustrated by one or more of blocks 205, 210, 215, 220 and/or 225. The various blocks described herein may be performed sequentially, in parallel, or in a different order than those described herein. It should also be appreciated that in some implementations one or more of the illustrated blocks may be eliminated, combined or separated into additional blocks.

Processing for method 200 may begin at block 205, "Receiving an indicator associated with a quantized error vector." Block 205 may be followed by block 210, "Translating the indicator into the quantized error vector." Block 210 may be followed by block 215, "Estimating the channel state information based, at least in part, on predicted channel state information and the quantized error vector." Block 215 may be followed by block 220, "Encoding data in accordance with the estimated channel state information." Block 215 may also be followed by block 225, "Predicting subsequent channel state information based, at least in part, on the estimated channel state information."

In block 205, an indicator associated with a quantized error vector may be received, by a computing device (e.g. a processor or DSP) or some device (e.g. a circuit, a radio set in the receiver, a portion of a transceiver, etc.) in a base or mobile station that is configured to receive the indicator. The indicator may be one or more indicators sent by a transceiver as described above with reference to FIG. 1 and block 125. The indicator may include one or more indices to codebooks. In some examples, the indicator may include all or a portion of the quantized error vector itself.

In block 210, the indicator may be translated into the quantized error vector. The translation may be performed by a computing device (e.g. a processor or DSP) or some device (e.g. a circuit, a radio set in the receiver, a portion of a transceiver, etc.) in a base or mobile station that is configured to translate the indicator into the quantized error vector. The translation may include selecting one or more codes in one or more codebooks associated with the indicator. In one example, the indicator may include a magnitude and a direction indicator, and a corresponding magnitude and direction codewords may be accessed. The translation may produce a quantized error vector, such as the quantized error vector $e_k'$ described above.

In block 215, channel state information may be estimated based, at least in part, on predicted channel state information and the quantized error vector. The estimation may be performed, by a computing device (e.g. a processor or DSP) or some device (e.g. a circuit, a radio set in the receiver, a portion of a transceiver, etc.) in a base or mobile station that is configured to estimate the channel state information. Examples of the estimation of channel state information from predicted channel state information and the quantized error vector has been described above with reference to block 130 of FIG. 1. Estimated channel state information $\hat{x}_k$ may be calculated in the block 215.

In block 220, data may be encoded in accordance with the estimated channel state information. The encoding may be performed by a computing device (e.g. a processor or DSP) or some device (e.g. a circuit, a radio set in the receiver, a portion of a transceiver, etc.) in a base or mobile station that is configured to encode data in accordance with channel state information. Any of a variety of suitable methods may be used to encode data in accordance with the estimated channel state information. In some examples, multiple transmit antennas may be weighted based on the estimated channel state information.

In block 225, subsequent channel state information may be predicted, based, at least in part, on the estimated channel state information. The prediction may be performed by a computing device (e.g. a processor or DSP) or some device (e.g. a circuit, a radio set in the receiver, a portion of a transceiver, etc.) in a base or mobile station that is configured to predict subsequent channel state information. Examples of the prediction of subsequent channel state information have been described above with reference to block 135 of FIG. 1. The prediction of subsequent channel state information may include a calculation of a tangent vector between two instances of channel state information, and the forward transportation of the tangent vector.

The method described in FIG. 2 may be repeated by using the predicted subsequent state information to estimate subsequent channel state information using subsequently translated quantized error vectors. In this manner, channel state information may be periodically updated in a transceiver by receiving indicators associated with quantized error vectors.

Figure 3:
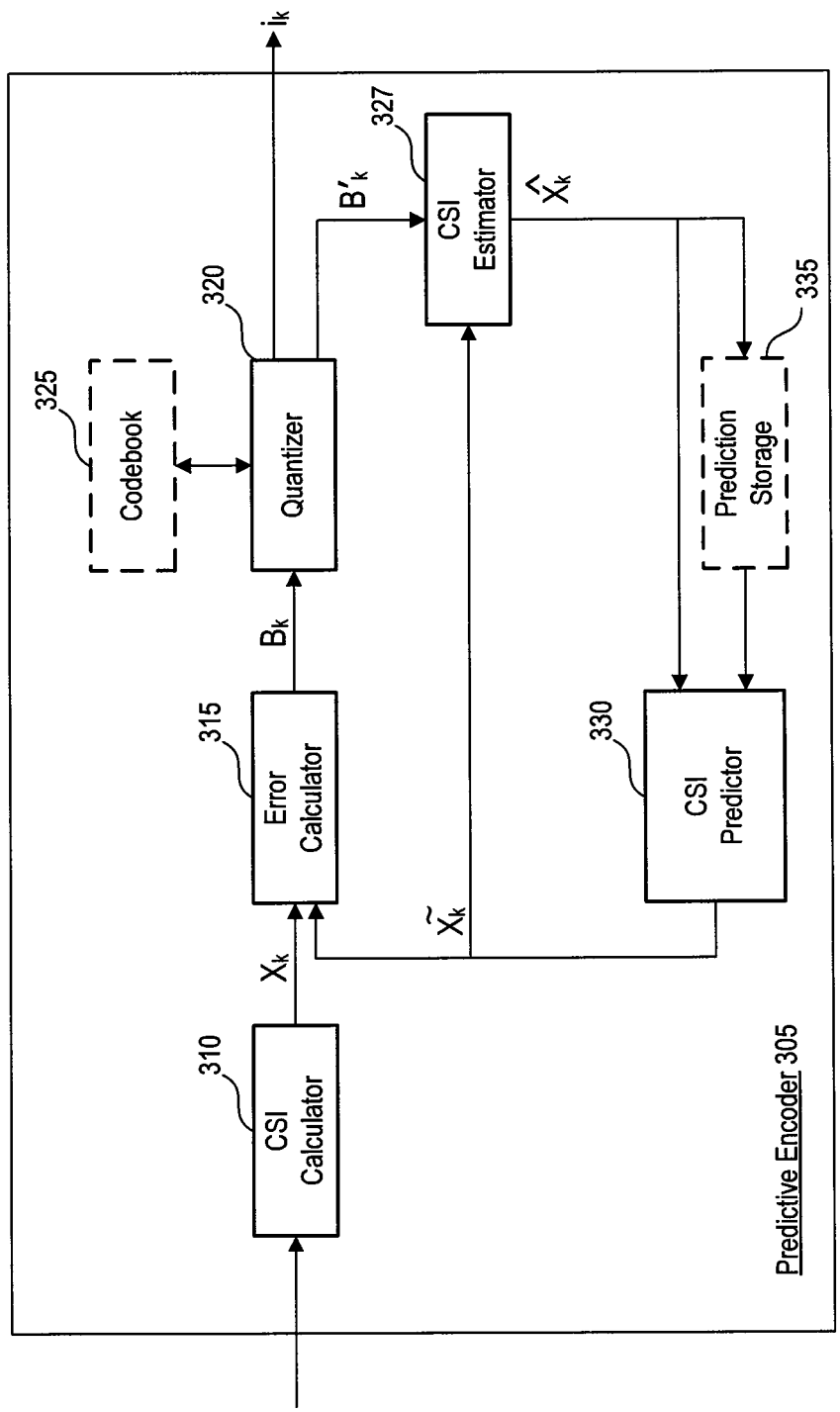
FIG. 3 is a schematic illustration of a predictive encoder arranged in accordance with at least some examples of the present disclosure.

FIG. 3 is a schematic illustration of a predictive encoder 305 arranged in accordance with at least some examples of the present disclosure. The example predictive encoder 305 may include one or more blocks such as a channel state information calculator 310, an error calculator 315, a quantizer 320, a codebook 325, a channel state information estimator 327, a channel state information predictor 3130 and/or prediction storage 335. The various blocks described herein may represent a portion of one or more functions, actions, or operations that may be performed in software executed by a processor (e.g., microprocessor, microcontroller, DSP, etc), circuits (e.g., digital, analog, ASIC, etc.) or some combination thereof. It should be appreciated that in some implementations one or more of the illustrated blocks may be eliminated, combined or separated into additional blocks.

The channel state information calculator 310 may be configured to calculate measured channel state information based, at least in part, on data received over a communications channel. The channel state information calculator 310 may be coupled to the error calculator 315. The error calculator 315 may be configured to calculate an error vector between the measured and predicted channel state information. The error calculator 315 may be coupled to the quantizer 320, which may be configured to select at least one codeword from the codebook corresponding to the error vector and generate an indicator associated with the selected codeword. The codebook 325 may be coupled or otherwise accessible to the quantizer 320. The channel state information estimator 327 may be coupled to the quantizer 320. The channel state information estimator may be configured to generate an estimate of the measured channel state information based, at least in part, on the selected codeword. The channel state information predictor 330 may be coupled to the channel state information estimator 327. The channel state information predictor 330 may be configured to predict subsequent channel state information based, at least in part, on the estimate of the channel state information and previously calculated channel state information. Prediction storage 335 may be coupled to the channel state information predictor 330 and the channel state information estimator 327, and may be configured to store previously estimated channel state information.

Examples of the predictive encoder 305 may be used to predict channel state information and generate error vectors corresponding to a difference between measured and predicted channel state information. Data received over a communications channel may be input into the predictive encoder 305. One or more indicators associated with a quantized error vector may be output from the predictive encoder 305. The predictive encoder 305 may generally implement all or portions of examples of methods described above with reference to FIG. 1.

The predictive encoder 305 may include a channel state information calculator 310. The channel state information calculator 310 may calculate measured channel state information based on data received over a communications channel. As described above, a variety of methods may be used to calculate channel state information. The channel state information calculator 310 may be implemented in hardware, software, or combinations thereof, and one or more processing units used to implement the channel state information calculator 310 may be shared with other components of the predictive encoder 305 described herein. The predictive encoder 305 may output measured channel state information, which may mathematically be represented as $x_k$ as described above.

The error calculator 315 may be coupled to the channel state information calculator 310. The error calculator may receive measured channel state information from the channel state information calculator 310 and may receive predicted channel state information from the channel state information predictor 330. The error calculator 315 may calculate an error vector from the predicted channel state information in some examples. The error calculator 315 may implement examples of methods for calculating the error vector as described above. Accordingly, the error calculator 315 may output an error vector which may mathematically be represented in some examples as $e_k$. The error calculator 315 may be implemented in hardware, software, or combinations thereof, and one or more processing units used to implement the error calculator 315 may be shared with other components of the predictive encoder 305 described herein.

The quantizer 320 may be coupled to the error calculator 315 and may receive the error vector $e_k$. The quantizer 320 may be configured to quantize the error vector in accordance with one or more examples of methods for quantizing the error vector described above. The quantizer 320 may accordingly select one or more codes from a codebook 325 using any of the example methods described above. The quantizer 320 may accordingly output a quantized error vector $e_k'$. The quantizer 320 may also output one or more indicators associated with the quantized error vector, such as one or more index values associated with the selected code from the codebook table 325. As described above, the one or more indicators may be transmitted to another transceiver in the communications system for use in estimating channel state information. The quantizer 320 may be implemented in hardware, software, or combinations thereof, and one or more processing units used to implement the quantizer 320 may be shared with other components of the predictive encoder 305 described herein.

The codebook 325 may be implemented using substantially any electronic storage medium and may be integrated with the predictive encoder 305 or separate from the predictive encoder 305 and in communication with the quantizer 320. Examples of codebooks are described above, and may be implemented as the codebook 325. In some examples, more than one codebook may be in communication with the quantizer 320, such as a magnitude and unit direction codebook.

The channel state information estimator 327 may be coupled to the quantizer 320 and the channel state information predictor 330. The channel state information estimator 327 may receive the quantized error vector from the quantizer 320. The channel state information estimator may also receive previously predicted channel state information from the channel state information predictor 330. The channel state information estimator may combine the quantized error vector with the previously predicted channel state information to generate an estimate of the measured channel state information, examples of which have been described above. Accordingly, the channel state information estimator 327 may output an estimate of the measured channel state information which may be given as $\hat{X}_k$. The channel state information estimator 327 may be implemented in hardware, software, or combinations thereof, and one or more processing units used to implement the channel state information estimator 327 may be shared with other components of the predictive encoder 305 described herein.

Prediction storage 335 may be implemented as substantially any type of electronic storage device. The prediction storage 335 may be integral with the predictive encoder 305 in some examples. In some examples, the prediction storage 335 may be separate from the predictive encoder 305 and in communication with the channel state information estimator 327. One or more storage devices used to implement the prediction storage 335 may be shared with other storage devices used to implement components of the predictive encoder 305 described herein. The prediction storage 335 may store one or more estimates of the channel state information generated by the channel state information estimator 327. The prediction storage 335 may be coupled to the channel state information predictor 330 and may provide values of previous quantized estimate of the channel state information to the channel state information predictor 330.

The channel state information predictor 330 may be coupled to the channel state information estimator 327 and the prediction storage 335. The channel state information predictor 330 may receive the estimate of the channel state information $\hat{X}_k$ and one or more previous quantized estimate of the channel state information from the prediction storage 335. The channel state information predictor 330 may predict subsequent channel state information using examples of methods described above. The channel state information predictor 330 may, for example, compute a linear combination of previously estimated channel state information. The channel state information predictor 330 may calculate a tangent vector between two instances of channel state information and transport the tangent vector forward, examples of which were described above. The channel state information predictor 330 may accordingly output predicted subsequent channel state information $\tilde{x}_{k+1}$. The channel state information predictor 330 may be implemented in hardware, software, or combinations thereof, and one or more processing units used to implement the channel state information predictor 330 may be shared with other components of the predictive encoder 305 described herein. The subsequent channel state information may then be used by the error calculator 315 to compute an error with subsequent measured channel state information. In this manner, the predictive encoder 305 may generate error vectors periodically during operation of a communications system.

Figure 4:
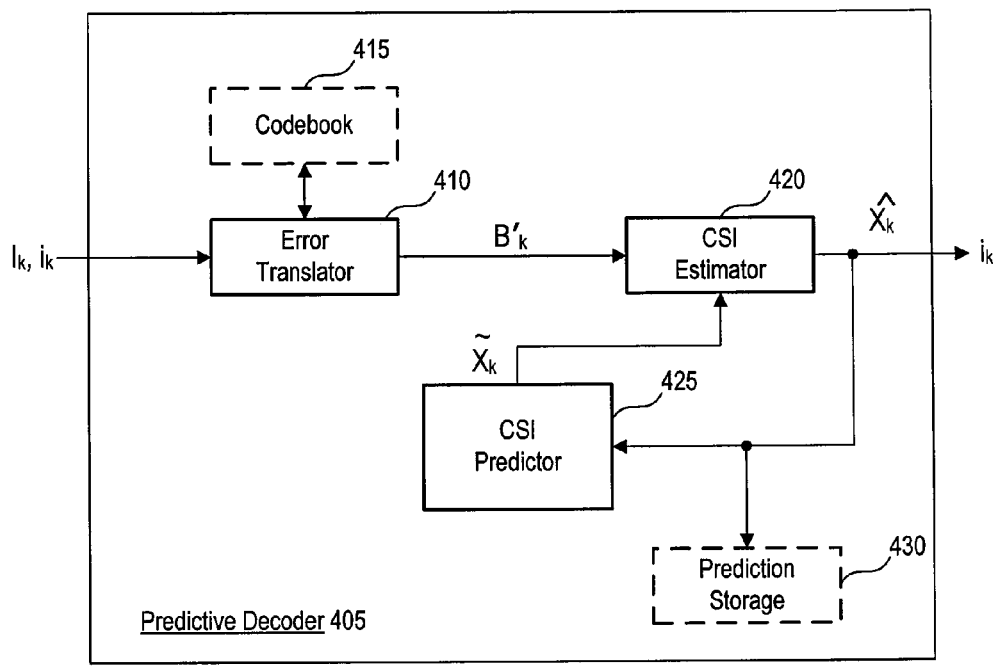
FIG. 4 is a schematic illustration of a predictive decoder 405 arranged in accordance with some examples of the present disclosure.

FIG. 4 is a schematic illustration of a predictive decoder 405 arranged in accordance with some examples of the present disclosure. The predictive decoder 405 may include one or more block such as an error translator 410, a codebook 415, a CSI estimator 420, a CSI predictor 425 and/or prediction storage 430. The various blocks described herein may represent a portion of one or more functions, actions, or operations that may be performed in software executed by a processor (e.g., microprocessor, microcontroller, DSP, etc), circuits (e.g., digital, analog, ASIC, etc.) or some combination thereof. It should be appreciated that in some implementations one or more of the illustrated blocks may be eliminated, combined or separated into additional blocks.

The error translator 410 may be configured to receive an indicator associated with a quantized error vector and translate the indicator into the quantized error vector. The codebook 415 may be coupled to the error translator 410 and the error translator 410 may access the codebook 415 to look-up a quantized error vector associated with the indicator. A channel state information estimator 420 may be coupled to the error translator 410. The channel state information estimator 420 may be configured to receive the quantized error vector and predicted state information from a channel state information predictor 425. The channel state information estimator 420 may be configured to generate an estimate of channel state information based, at least in part, on the quantized error vector and the predicted channel state information. The channel state information predictor 425 may be coupled to the channel state information estimator. The channel state information predictor 425 may be configured to receive the estimated channel state information, and previously estimated channel state information. The channel state information predictor 425 may be configured to predict subsequent channel state information based, at least in part, on the estimated channel state information and previously estimated channel state information. The prediction storage 430 may be coupled to the channel state information estimator 420 and the channel state information predictor 425 and may be configured to store estimated channel state information and provide previously estimated channel state information to the channel state information predictor 425.

The error translator 410 is configured to receive at least one indicator associated with a quantized error vector, such as $i_k$ or $l_k$ as described above, or both $i_k$ and $l_k$. The indicator may be generated by an example of a predictive encoder in some examples. The error translator may be configured to translate the indicator into the quantized error vector. In some examples, the indicator may include all or a portion of the quantized error vector itself. In some examples, the error translator 410 may access a codebook 415 to select a codeword associated with the indicator. In some examples, the error translator 410 may access more than one codebook. The error translator 410 may output an example of a quantized error vector as described above, which may be represented as $e_k'$. Note that substantially the same quantized error vector $e_k'$ may be generated by the error translator 410 as was generated by the quantizer 320 of the predictive encoder 305 of FIG. 3. The error translator 410 may be implemented in hardware, software, or combinations thereof, and one or more processing units used to implement the error translator 410 may be shared with other components of the predictive decoder 405 described herein.

The codebook 415 may be implemented using substantially any electronic storage medium and may be integrated with the predictive decoder 405 or separate from the predictive decoder 405 and in communication with the error translator 410. Examples of codebooks are described above, and may be implemented as the codebook 415. In some examples, more than one codebook may be in communication with the error translator 410, such as a magnitude and unit direction codebooks. In some examples, the codebook 415 may be substantially the same as the codebook 325 in FIG. 3.

The channel state information estimator 420 may be coupled to the error translator 410 and the channel state information predictor 425. The channel state information estimator may be configured to receive the quantized error vector from the error translator 410 and predicted channel state information from the channel state information predictor 425. The channel state information estimator 420 may generate estimated channel state information based, at least in part, on the quantized error vector and the predicted channel state information in accordance with examples of methods for estimating channel state information described above. The estimated channel state information may be mathematically expressed as $\hat{x}_k$. The estimated channel state information may be used to encode data for transmission over a communications channel. In some examples, the estimated channel state information may be used to weight one or more transmit antennas in a communications system. Note that the estimated channel state information $\hat{x}_k$ generated by the channel state information estimator 420 may be substantially the same as estimated channel state information generated by the channel state information estimator 327 of the predictive encoder 305 of FIG. 3. The channel state information estimator 420 may be implemented in hardware, software, or combinations thereof, and one or more processing units used to implement the channel state information estimator 420 may be shared with other components of the predictive decoder 405 described herein.

Prediction storage 430 may be implemented as substantially any type of electronic storage device. The prediction storage 430 may be integral with the predictive decoder 405 in some examples. In some examples, the prediction storage 430 may be separate from the predictive decoder 405 and in communication with the channel state information estimator 420. One or more storage devices used to implement the prediction storage 430 may be shared with other storage devices used to implement components of the predictive encoder 405 described herein. The prediction storage 420 may store one or more estimates of the channel state information generated by the channel state information estimator 420. The prediction storage 430 may be coupled to the channel state information predictor 425 and may provide values of previously predicted channel state information to the channel state information predictor 425.

The channel state information predictor 425 may be coupled to the channel state information estimator 420 and the prediction storage 430. The channel state information predictor 425 may receive the estimate of the channel state information $\hat{x}_k$ and one or more previous quantized estimate of the channel state information from the prediction storage 430. The channel state information predictor 425 may predict subsequent channel state information using examples of methods described above. The channel state information predictor 425 may, for example, compute a linear combination of previously estimated channel state information. The channel state information predictor 425 may calculate a tangent vector between two instances of channel state information and transport the tangent vector forward, examples of which were described above. The channel state information predictor 425 may accordingly output predicted subsequent channel state information $\tilde{x}_{k+1}$. Note that the subsequent channel state information generated by the channel state information predictor 425 may be substantially the same as the subsequent channel state information generated by the channel state information predictor 330 of the predictive encoder 305 of FIG. 3. The channel state information predictor 425 may be implemented in hardware, software, or combinations thereof, and one or more processing units used to implement the channel state information predictor 425 may be shared with other components of the predictive decoder 405 described herein. The subsequent channel state information may then be used by the channel state information estimator 420 to compute subsequent estimated channel state information. In this manner, the predictive decoder 405 may generate estimated channel state information periodically during operation of a communications system.

Figure 5:
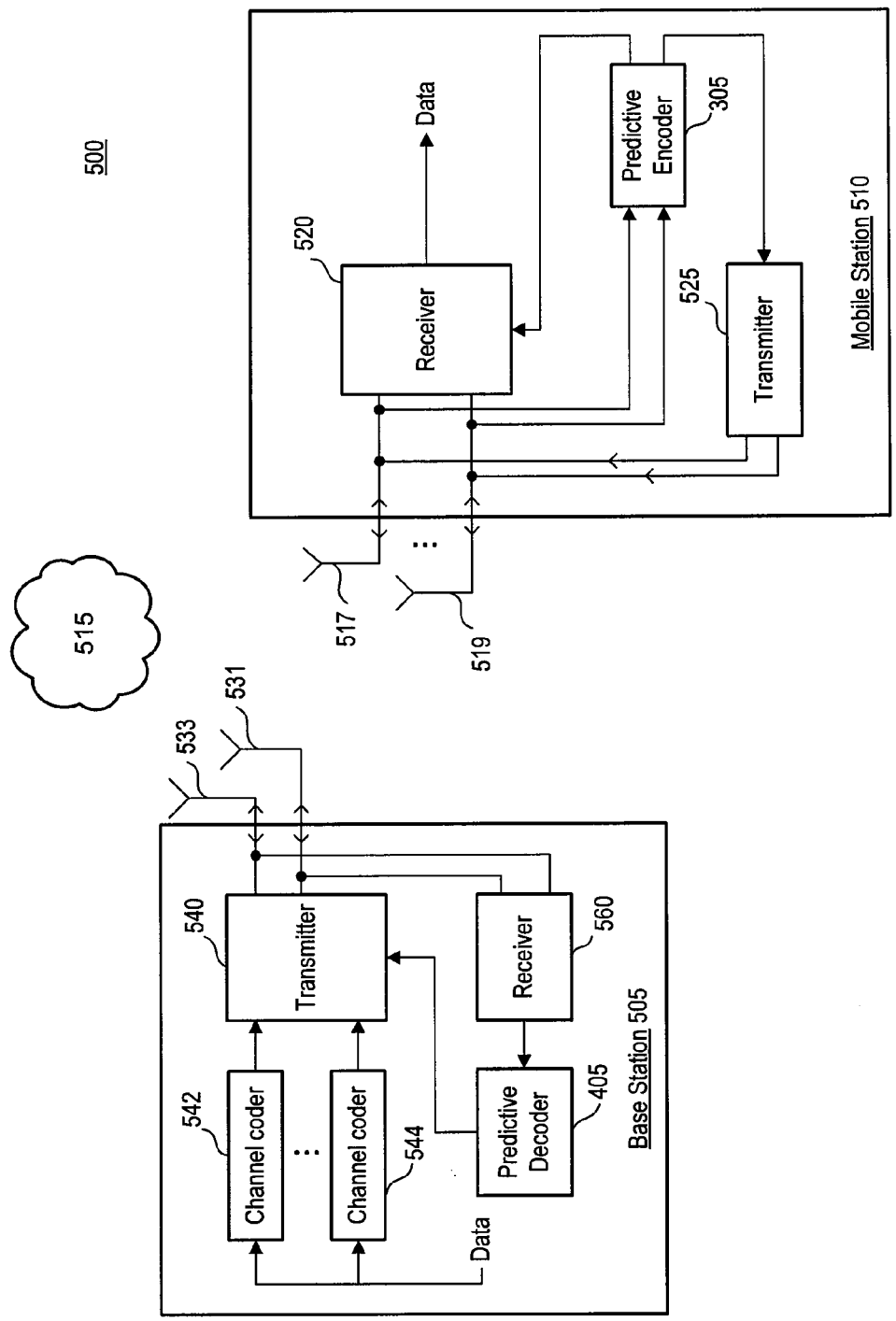
FIG. 5 is a schematic illustration of a communications system arranged in accordance with at least some examples of the present disclosure.

FIG. 5 is a schematic illustration of a communications system 500 arranged in accordance with at least some examples of the present disclosure. An example communication system 500 may include a base station 505 configured for communication with a mobile station 510 over a communications channel 515.

The mobile station 510 may include antennas 517 and 519, a receiver 520, a transmitter 525, and a predictive encoder 305. The antennas 517 and 519 are coupled to the receiver 520, the transmitter 525 and the predictive encoder 305. The predictive encoder is further coupled to the receiver 520 and the transmitter 525.

In operation, mobile station 510 can be configured to receive signals from the communications channel 515 by the cooperative operation of one or more of the antennas 517 and 519 and the receiver 520. The receiver 520 may be configured to output decoded data in response to the received signals. Signals received from the communications channel 515 may also or instead be provided from one or more of the antennas 517 and 519 to the predictive encoder 305. The predictive encoder 305 may be configured to provide one or more indicators associated with a quantized error vector to the transmitter 525 and receiver 520. The receiver 520 may be configured to use the indicators in decoding data. The transmitter 525 may be configured to transmit the indicators over the communications channel 515 to the base station 505.

The base station 505 may include antennas 531 and 533, a transmitter 540, channel coders 542 and 544, a receiver 560, and a predictive decoder 405. The antennas 531 and 533 are coupled to the transmitter 540 and the receiver 560. The receiver 560 is coupled to the predictive decoder 405. The predictive decoder 405 is coupled to the transmitter 540. The channel coders are also coupled to the transmitter 540.

In operation, base station 505 can be configured to transmit signals into the communication channel 515 by the cooperative operation of one or more of the antennas 531 and 533 and the transmitter 540. Signals received by the antennas 531 and 533 may encode one or more indicators as described above. The signals received by the antennas 531 and 533 may be provided to a receiver 560 that may decode the indicators and provide the indicators to a predictive decoder 405. Recall, as described above, the indicators may include data indicative of an error between measured and predicted channel state information. The predictive decoder 405 may be configured to generate an estimate of channel state information responsive to the indicators, as described above with reference to FIG. 4, and provide the estimate to a transmitter 540. The transmitter may be configured to encode data received from one or more channel coders 542, 544 in accordance with the channel state information estimated by the predictive decoder 405. In this manner, channel state information may be generated at a transmitting device based on an error between previous estimates of channel state information.

Any number of mobile stations, including the mobile station 510 may be included in examples of communication systems in accordance with the present disclosure. Any of a variety of devices may be used to implement a mobile station 510, such as a computer or cellular telephone, and the mobile station 510 need not be physically mobile in some examples.

The mobile station 510 may have any number of antennas. The receiver 520 may be configured to decode data symbols from signals received at the antennas 517 and 519. Any of a variety of components may be included in the receiver 520 including decoders and demodulators suitable for the processing of received signals. The transmitter 525 may be configured to encode data symbols or feedback for transmission of signals by the antennas 517 and 519 over the communications channel 515. Any of a variety of components may be included in the transmitter 525 suitable for the processing and transmission of signals, including one or more encoders or modulators.

Examples of the predictive encoder 305 have been described above with reference to FIG. 3. The predictive encoder may be configured to receive signals transmitted over the communications channel from the antennas 517 and 519 and generate a quantized error vector based, at least in part, on an error between measured and predicted channel state information. One or more indicators associated with the quantized error vector may be transmitted to one or more transceivers in the communications system, such as the base station 505 over the communications channel 515. The indicators, for example, may include data specifying an entry in a codebook table used to look-up the quantized error vector. Any communications channel may be used to communicate the data representing the indicators.

The base station 505 may have any number of antennas. The transmitter 540 may be configured to encode data for transmission over the communications channel 515. The transmitter may be configured to receive signals for transmission from one or more channel coders 542 and 544. Any of a variety of components suitable for processing data for transmission may be included in the channel coders 542, 544 and the transmitter 540, including for example, one or more encoders or modulators.

Examples of the predictive decoder 405 have been described above with reference to FIG. 4. The predictive decoder 405 may be configured to receive signals over the communications channel from the receiver 360. The received signals may be encoded with data representing one or more indicators associated with a quantized error vector. As described above, the predictive decoder 405 may be configured to decode the indicators from the received signals and estimate channel state information based, at least in part, on the quantized error vector. The predictive decoder 405 may be configured to provide the channel state information to the transmitter 540, and the transmitter 540 may be configured to encode data for transmission in accordance with the channel state information.

In this manner, higher resolution channel state information may in some examples be generated at the base station 505 based on the received indicator of a quantized error vector than in systems where quantized channel state information itself may be transmitted across the communications channel.

Figure 6:
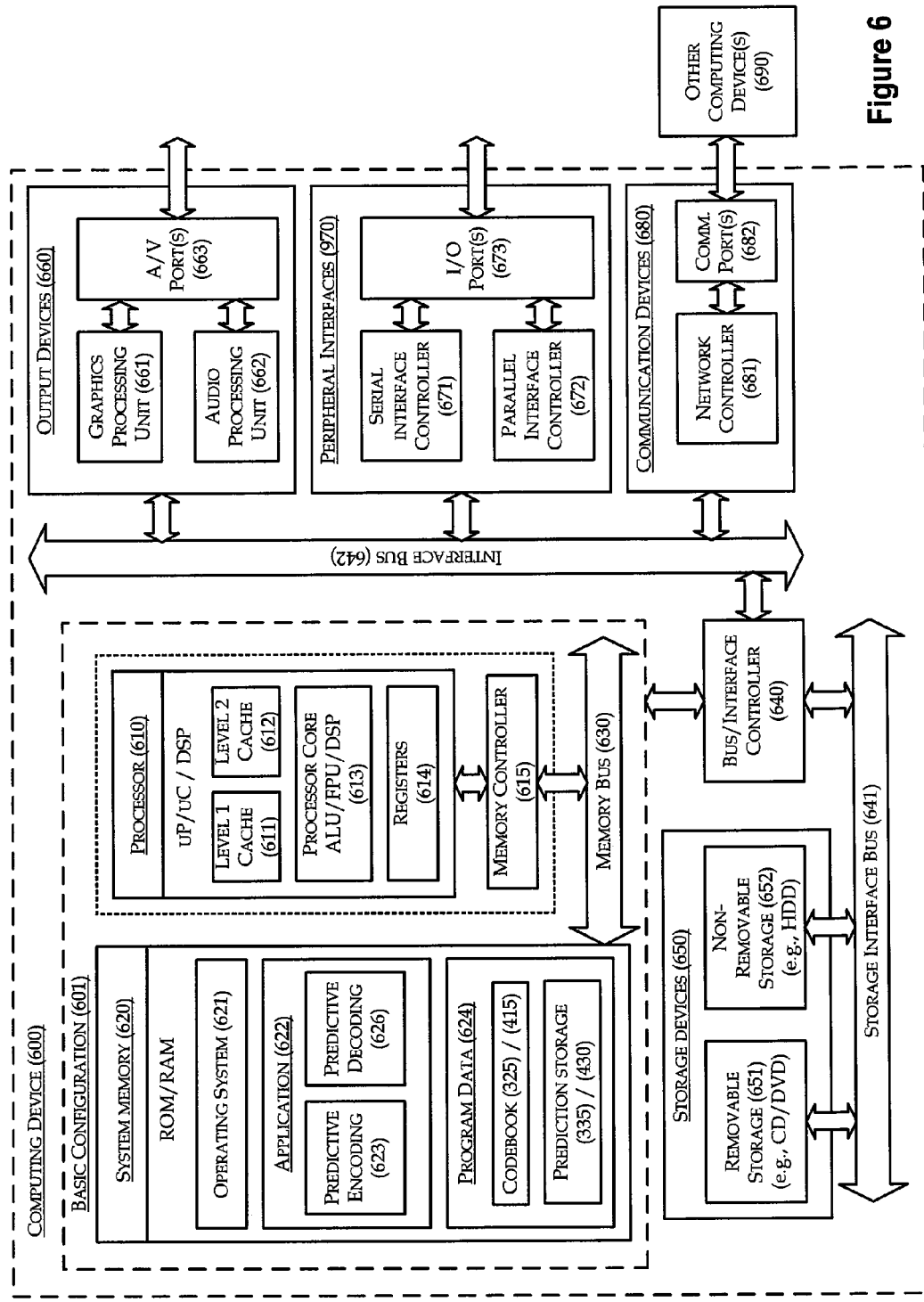
FIG. 6 is a block diagram illustrating an example computing device 600 that is arranged for predictive encoding, predictive decoding, or both in accordance with at least some examples of the present disclosure.

FIG. 6 is a block diagram illustrating an example computing device 600 that is arranged for predictive encoding, predictive decoding, or both in accordance with at least some examples of the present disclosure. The computing device 600 may, for example, be used to implement the predictive encoder 305 of FIG. 3 and/or the predictive decoder 405 of FIG. 4 in some examples. In a very basic configuration 601, computing device 600 typically includes one or more processors 610 and system memory 620. A memory bus 630 may be used for communicating between the processor 610 and the system memory 620.

Depending on the desired configuration, processor 610 may be of any type including but not limited to a microprocessor ($\mu$P), a microcontroller ($\mu$C), a digital signal processor (DSP), or any combination thereof. Processor 610 may include one more levels of caching, such as a level one cache 611 and a level two cache 612, a processor core 613, and registers 614. An example processor core 613 may include an arithmetic logic unit (ALU), a floating point unit (FPU), a digital signal processing core (DSP Core), or any combination thereof. An example memory controller 615 may also be used with the processor 610, or in some implementations the memory controller 615 may be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624. Application 622 may include a predictive encoding method 623 that is arranged to generate data indicative of a quantized error between measured and predicted channel state information, as described above with reference to FIGS. 1 and 3. Program Data 624 may include the codebook 325 and the prediction storage 335, as described above. In some embodiments, application 622 may be arranged to operate with program data 624 on an operating system 621 such that an error vector between measured and predicted channel state information is calculated. This described basic configuration is illustrated in FIG. 6 by those components within dashed line 601.

Application 622 may, in addition to or instead of the predictive encoding method 623, include a predictive decoding method 626 that is arranged to generate estimated channel state information based on a received representation of an error between measured and estimated channel state information, as described above with reference to FIGS. 2 and 4. Program Data 624 may, in addition or instead of data previously mentioned, include the codebook 415 and the prediction storage 430, as described above. In some embodiments, application 622 may be arranged to operate with program data 624 on an operating system 621 such that channel state information is calculated based on a received indication of measured error and previously predicted channel state information.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of device 600.

Computing device 600 may also include an interface bus 642 for facilitating communication from various interface devices (e.g., output interfaces, peripheral interfaces, and communication interfaces) to the basic configuration 601 via the bus/interface controller 640. Example output devices 660 include a graphics processing unit 661 and an audio processing unit 662, which may be configured to communicate to various external devices such as a display or speakers via one or more A/V ports 663. Example peripheral interfaces 670 include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication device 680 includes a network controller 681, which may be arranged to facilitate communications with one or more other computing devices 690 over a network communication link via one or more communication ports 682.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

Figure 7:
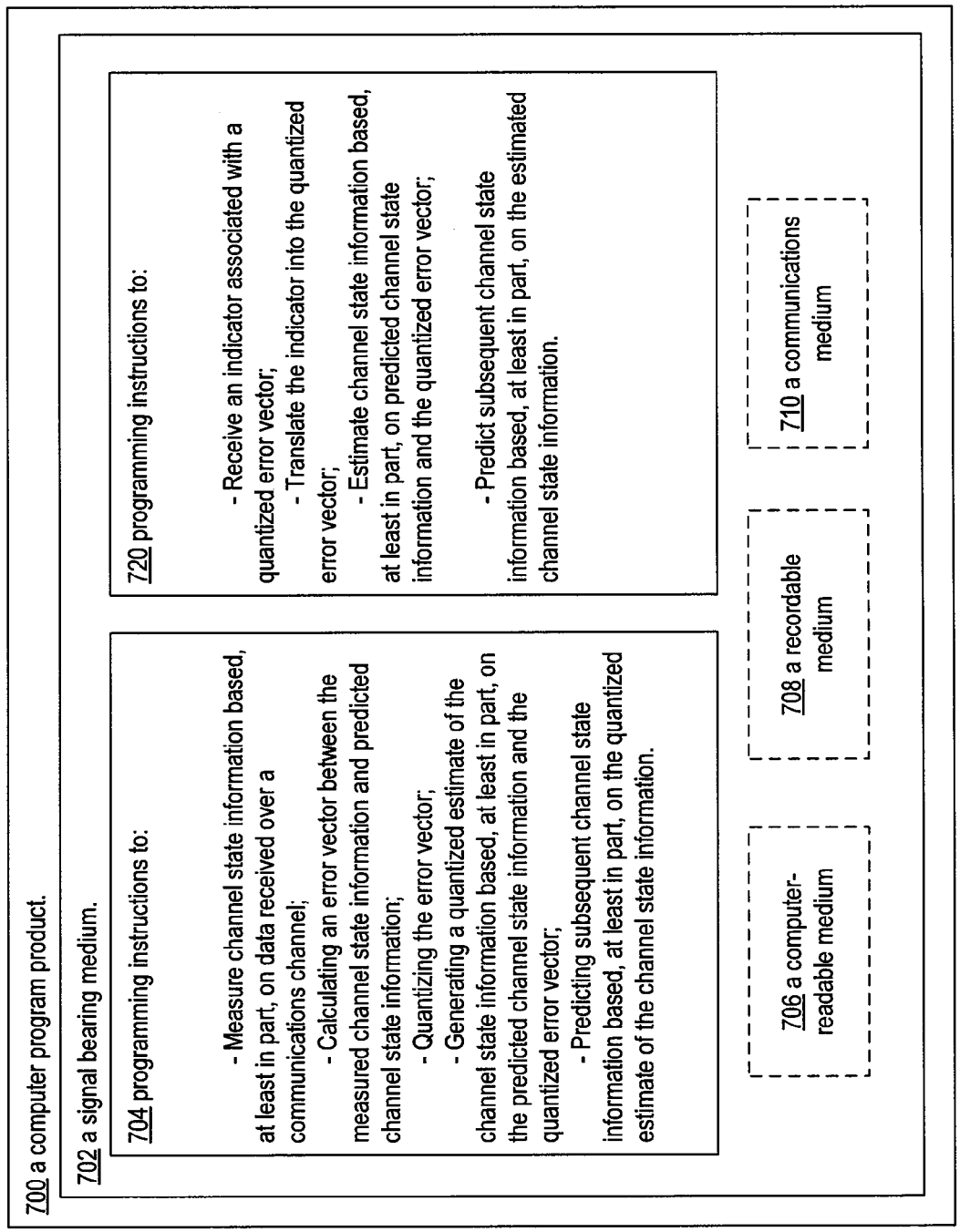
FIG. 7 is a block diagram illustrating an example computer program product 700 that is arranged to store instructions for predictive encoding, predictive decoding, or both in accordance with the present disclosure.

FIG. 7 is a block diagram illustrating an example computer program product 700 that is arranged to store instructions for predictive encoding, predictive decoding, or both in accordance with the present disclosure. The signal bearing medium 702 which may be implemented as or include a computer-readable medium 706, a recordable medium 708, a communications medium 710, or combinations thereof, stores instructions 704 that may configure the processing unit to perform all or some of the processes previously described. These instructions 704 may include, for example, one or more executable instructions for measuring channel state information based, at least in part, on signals received over a communications channel. The instructions 704 may further include instructions for calculating an error vector between the measured channel state information and predicted channel state information. The instructions 704 may further include instructions for quantizing the error vector. The instructions 704 may further include instructions for generating a quantized estimate of the channel state information based, at least in part, on the predicted channel state information and the quantized error vector. The instructions may further include instructions for predicting subsequent channel state information based, at least in part, on the quantized estimate of the channel state information. In other examples, the instructions 704 may include instructions for implementing all or a portion of the functions of the predictive encoder described above with reference to FIGS. 1 and 3.

The signal bearing medium 702 may additionally or instead store instructions 720 that may include, for example, one or more executable instructions for receiving data representing a quantized error vector. The instructions 720 may further include instructions for translating the data into the quantized error vector. The instructions 720 may further include instructions for estimating channel state information based, at least in part, on predicted channel state information and the quantized error vector. The instructions 720 may further include instructions for predicting subsequent channel state information based, at least in part, on the estimated channel state information. In other examples, the instructions 720 may include instructions for implementing all or a portion of the functions of the predictive decoder described above with reference to FIGS. 2 and 4.

The present disclosure is not to be limited in terms of the particular examples described in this application, which are intended as illustrations of various aspects. Many modifications and examples can may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method for communicating channel state information, the method comprising:
   measuring channel state information based, at least in part, on signals received over a communications channel;
   calculating, at a processing unit, an error vector between the measured channel state information and predicted channel state information;
   quantizing the error vector; and
   predicting, at the processing unit, subsequent channel state information based, at least in part, on the quantized error vector;
   wherein quantizing the error vector comprises:
   selecting a first codeword from a first codebook corresponding to a quantized magnitude of the error vector; and
   selecting a second codeword from a second codebook corresponding to a quantized direction of the error vector.

2. The method of claim 1, further comprising generating a quantized estimate of the channel state information based, at least in part, on the predicted channel state information and the quantized error vector.

3. The method of claim 1, wherein the channel state information comprises a unit vector.

4. The method of claim 1, wherein the channel state information is in the Grassmann manifold.

5. The method of claim 1, wherein the error vector comprises a tangent vector from the measured channel state information to the predicted channel state information.

6. The method of claim 1, further comprising transmitting an indicator associated with the quantized error vector to a receiver.

7. The method of claim 6, wherein quantizing the error vector comprises selecting at least one of the values stored in a codebook, and wherein transmitting the indicator comprises transmitting an index value corresponding to the selected at least one of the values stored in the codebook to a receiver.

8. The method of claim 1, wherein selecting the first codeword comprises selecting a codeword associated with a minimum difference between the codeword and a magnitude of the error vector, and wherein selecting the second codeword comprises:
   generating estimated channel state information based on each of a plurality of codewords in the second codebook;
   calculating a distance between the estimated channel state information and the measured channel state information; and
   selecting the second codeword from the plurality of codewords in the second codebook based, at least in part, on the chordal distance.

9. A method for encoding data for transmission, the method comprising:
   receiving signals that include data specifying an indicator associated with a quantized error vector;
   translating the indicator into the quantized error vector;
   estimating channel state information based, at least in part, on predicted channel state information and the quantized error vector; and
   encoding data for transmission in accordance with the estimated channel state information;
   wherein translating the indicator comprises:
   selecting a first codeword from a first electronic codebook corresponding to a magnitude of the quantized error vector; and
   selecting a second codeword from a second electronic codebook corresponding to a direction of the quantized error vector.

10. The method of claim 9, further comprising predicting subsequent channel state information based, at least in part, on the estimated channel state information.

11. The method of claim 9, wherein the estimated channel state information comprises a unit vector.

12. The method of claim 9, wherein the estimated channel state information is in the Grassmann manifold.

13. The method of claim 9, wherein the indicator comprises an index value of at least one code in an electronic codebook.

14. The method of claim 9, wherein encoding the data comprises weighting a plurality of transmit antennas in accordance with the estimated channel state information.

15. A predictive encoder comprising:
a channel state information calculator configured to calculate measured channel state information based, at least in part, on signals received over a communications channel;
an error calculator coupled to the channel state information calculator, wherein the error calculator is configured to receive the measured channel state information, receive predicted channel state information, and calculate an error vector between the measured channel state information and the predicted channel state information;
a quantizer coupled to the error calculator, wherein the quantizer is configured to receive the error vector, select at least one codeword from a codebook table corresponding to the error vector, and generate an indicator associated with the at least one selected codeword, wherein the at least one selected codeword is selected based on a distance between an estimated channel state information associated with a codeword of the codeword table and the measured channel state information;
a channel state information estimator coupled to the quantizer, wherein the channel state information estimator is configured to receive the at least one selected codeword, and generate a quantized estimate of the measured channel state information based, at least in part, on the at least one selected codeword; and
a channel state information predictor coupled to the channel state information estimator, wherein the channel state information predictor is configured to receive the quantized estimate of by the measured channel state information, and calculate subsequent channel state information based, at least in part, on the quantized estimate of the measured channel state information and previously calculated channel state information.

16. The predictive encoder of claim 15, further comprising a prediction storage coupled to the channel state information estimator and the channel state information predictor, wherein the prediction storage is configured to store the previously calculated channel state information.

17. The predictive encoder of claim 15, wherein the quantizer is further configured to calculate a difference between a magnitude of each of a plurality of codewords and a magnitude of the error vector, and wherein the at least one selected codeword comprises a codeword of the plurality of codewords associated with a smallest difference.

18. The predictive encoder of claim 15, wherein the quantizer is further configured to calculate the estimated channel state information based on each of a plurality of codewords of the codebook table, and calculate the distance between the respective estimated channel state information associated with a codeword of the plurality of codewords of the codebook table and the measured channel state information, wherein the at least one selected codeword comprises a codeword of the plurality of codewords of the codebook table associated with a smallest chordal distance.

19. The predictive encoder of claim 15, wherein the channel state information predictor is further configured to:
calculate a tangent vector between two instances of channel state information;
calculate a transported tangent vector based, at least in part, on the tangent vector; and
calculate the subsequent channel state information based, at least in part, on the transported tangent vector.

20. The predictive encoder of claim 15, wherein the channel state information comprises a unit vector.

21. The predictive encoder of claim 15, wherein the channel state information is in the Grassmann manifold.

22. A predictive decoder comprising:
an error translator configured to receive at least one indicator associated with a quantized error vector, and translate the indicator into a quantized error vector;
a channel state information estimator coupled to the error translator, wherein the channel state information estimator is configured to receive the quantized error vector, and generate an estimate of channel state information based, at least in part, on the quantized error vector and predicted channel state information; and
a channel state information predictor coupled to the channel state information estimator, wherein the channel state information predictor is configured to receive the estimate of the channel state information and calculate the subsequent predicted channel state information based, at least in part, on the estimate of the channel state information and previously calculated channel state information,
wherein the channel state information predictor is further configured to:
calculate a tangent vector between two instances of channel state information;
calculate a transported tangent vector based, at least in part, on the tangent vector; and
calculate the subsequent predicted channel state information based, at least in part, on the transported tangent vector.

23. The predictive decoder of claim 22, wherein the error translator is further configured to access a codebook and select at least one codeword corresponding to the at least one indicator.

24. The predictive decoder of claim 22, further comprising prediction storage coupled to the channel state information estimator and the channel state information predictor, wherein the prediction storage is configured to store previously estimated channel state information.

25. A method for communicating channel state information, the method comprising:
measuring channel state information based, at least in part, on signals received over a communications channel;
calculating, at a processing unit, an error vector between the measured channel state information and predicted channel state information;
quantizing the error vector; and
predicting, at the processing unit, subsequent channel state information based, at least in part, on the quantized error vector;
wherein predicting subsequent channel state information comprises:
calculating a tangent vector between at least two instances of quantized estimate of the channel state information;
calculating a transported tangent vector based, at least in part, on the tangent vector; and
calculating the predicted channel state information based, at least in part, on the transported tangent vector.

26. The method of claim 25, wherein calculating the tangent vector comprises calculating a tangent vector between a quantized estimate of the channel state information and previous quantized estimate of the channel state information.

27. The method of claim 11, further comprising storing the calculated predicted channel state information.

28. A method for encoding data for transmission, the method comprising:
- receiving signals that include data specifying an indicator associated with a quantized error vector;
- translating the indicator into the quantized error vector;
- estimating channel state information based, at least in part, on predicted channel state information and the quantized error vector; and
- encoding data for transmission in accordance with the estimated channel state information;
- wherein predicting subsequent channel state information comprises:
- calculating a tangent vector between at least two instances of the predicted channel state information;
- calculating a transported tangent vector based, at least in part, on the tangent vector; and
- calculating the predicted channel state information based, at least in part, on the transported tangent vector.

29. The method of claim 28, wherein calculating the tangent vector comprises calculating a tangent vector between the estimated channel state information and previously predicted channel state information.

30. The method of claim 29, further comprising storing the previously predicted channel state information.

* * * * *

UNITED STATES PATENT AND TRADEMARK OFFICE
CERTIFICATE OF CORRECTION

PATENT NO. : 8,711,961 B2  
APPLICATION NO. : 12/836843  
DATED : April 29, 2014  
INVENTOR(S) : Heath, Jr. et al.

It is certified that error appears in the above-identified patent and that said Letters Patent is hereby corrected as shown below:

In the Specification

Column 6, Line 2, delete " $\vec{c}_k = (x_k/\rho - \hat{x}_k)/(d/\|\rho\|)$ " and insert -- $\vec{e}_k = (x_k/\rho - \tilde{x}_k)/(d/\|\rho\|)$ --, therefor.

In the Claims

Column 23, Line 42, in Claim 15, delete "of by" and insert -- of --, therefor.

Signed and Sealed this  
Sixteenth Day of December, 2014

Michelle K. Lee  
*Deputy Director of the United States Patent and Trademark Office*